United States Patent
Stolzenburg-Martin

(10) Patent No.: US 12,491,127 B2
(45) Date of Patent: Dec. 9, 2025

(54) HANDHELD BRAILLE ASSEMBLY

(71) Applicant: Darrien Stolzenburg-Martin, Denver, CO (US)

(72) Inventor: Darrien Stolzenburg-Martin, Denver, CO (US)

( * ) Notice: Subject to any disclaimer, the term of this patent is extended or adjusted under 35 U.S.C. 154(b) by 458 days.

(21) Appl. No.: 18/142,014

(22) Filed: May 1, 2023

(65) Prior Publication Data

US 2024/0366460 A1   Nov. 7, 2024

(51) Int. Cl.
*A61H 3/06* (2006.01)
*G09B 21/00* (2006.01)

(52) U.S. Cl.
CPC ........... *A61H 3/061* (2013.01); *G09B 21/003* (2013.01); *A61H 2003/065* (2013.01)

(58) Field of Classification Search
None
See application file for complete search history.

(56) References Cited

U.S. PATENT DOCUMENTS

| | | | |
|---|---|---|---|
| 6,502,032 B1 * | 12/2002 | Newman | G09B 21/003 701/487 |
| 6,774,788 B1 | 8/2004 | Balfe | |
| D599,798 S | 9/2009 | Fitch | |
| 9,510,993 B2 | 12/2016 | Te | |
| 9,990,860 B2 | 6/2018 | Zhang | |
| 10,290,225 B1 | 5/2019 | Danyluk | |
| 2013/0092851 A1 | 4/2013 | Sakiya | |
| 2014/0377722 A1 * | 12/2014 | Reid | G09B 21/005 434/114 |
| 2015/0125831 A1 | 5/2015 | Chandrashekhar Nair | |
| 2015/0238383 A1 * | 8/2015 | Te | G01C 21/3629 701/468 |
| 2015/0310762 A1 * | 10/2015 | Seim | G09B 15/00 434/113 |
| 2018/0350264 A1 * | 12/2018 | Dhar | G09B 21/003 |

* cited by examiner

*Primary Examiner* — James B Hull

(57) ABSTRACT

A handheld Braille assembly includes a cylinder that has a lower end and an upper end. The cylinder has a communication pad that is integrated into the cylinder. The communication pad is strategically located on the cylinder to rest in the palm of the user's hand. The communication pad has a plurality of Braille dots integrated into the communication pad to touch the user's palm when the cylinder is gripped. A communication unit is integrated into the cylinder to vibrate the respective Braille dots according to a predetermined sequence for communicating instructions to the user. A feedback stick extends away from the upper end of the cylinder wherein the feedback stick is configured to be touched by the user. The communication unit vibrates the feedback stick in a predetermined sequence of vibrations to communicate which of the operational sequences the communication unit has been actuated to perform.

16 Claims, 8 Drawing Sheets

HANDHELD BRAILLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to Braille devices and more particularly pertains to a new Braille device for facilitating an impaired user to receive navigation information and text messaging via Braille. The device includes a cylinder that can be held in the palm of a user's hand. The device includes a communication pad that has a plurality of Braille dots that vibrate in accordance with the Braille alphabet. In this way the communication pad translates text messages or navigation data into Braille. The device includes a feedback stick which vibrates for communicating operational parameters that have been selected for the communication pad.

(2) Description of Related Art Including Information Disclosed Under 37 CFR 1.97 and 1.98

The prior art relates to Braille devices including a navigation device for blind users that includes a keyboard, a Braille pad and an electronic display. The prior art discloses a hand held communication device for blind users that includes a speaker, headphones and a remote control. The prior art discloses guiding device for a blind user that includes an alphanumeric keypad with Braille dots and an electronic display. The prior discloses a wrist mounted navigation unit for blind users which includes a Braille display. The prior art discloses a handheld device that includes a tactile pin array for communicating Braille and a set of cameras.

BRIEF SUMMARY OF THE INVENTION

An embodiment of the disclosure meets the needs presented above by generally comprising a cylinder that has a lower end and an upper end. The cylinder has a communication pad that is integrated into the cylinder. The communication pad is strategically located on the cylinder to rest in the palm of the user's hand. The communication pad has a plurality of Braille dots integrated into the communication pad to touch the user's palm when the cylinder is gripped. A communication unit is integrated into the cylinder to vibrate the respective Braille dots according to a predetermined sequence for communicating instructions to the user. A feedback stick extends away from the upper end of the cylinder wherein the feedback stick is configured to be touched by the user. The communication unit vibrates the feedback stick in a predetermined sequence of vibrations to communicate which of the operational sequences the communication unit has been actuated to perform.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
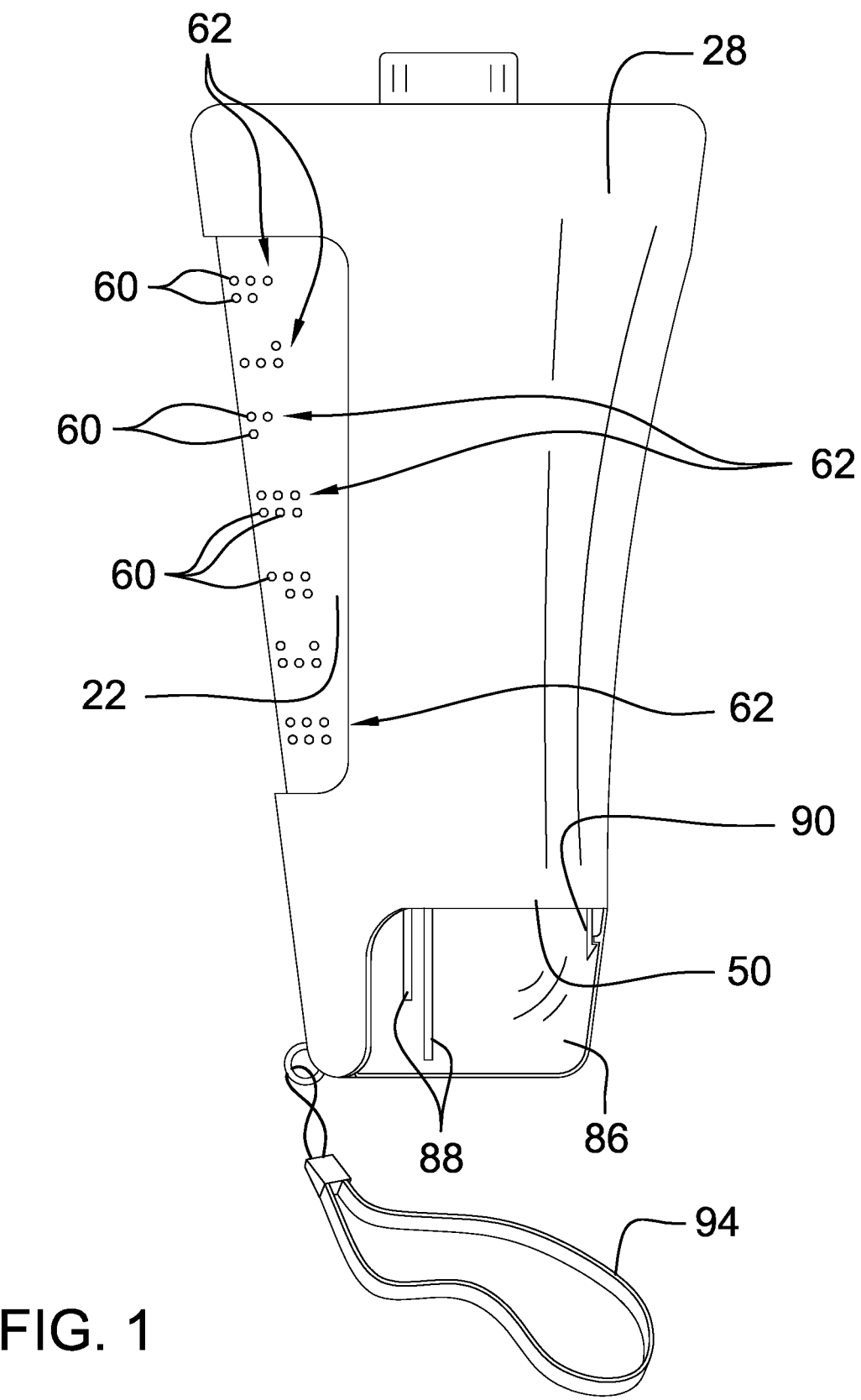
FIG. 1 is a left side view of a handheld Braille assembly according to an embodiment of the disclosure.

With reference now to the drawings, and in particular to FIGS. 1 through 8 thereof, a new Braille device embodying the principles and concepts of an embodiment of the disclosure and generally designated by the reference numeral 10 will be described.

As best illustrated in FIGS. 1 through 8, the handheld Braille assembly 10 generally comprises a cylinder 12 has a lower end 14 and an upper end 16. The cylinder 12 tapers between the upper end 16 and the lower end 14 such that the cylinder 12 has a frusto-conical shape. In this way the cylinder 12 can fit comfortably in a palm 18 of a user's hand 20. The cylinder 12 has a communication pad 22 that is integrated into the cylinder 12 and the communication pad 22 is strategically located on the cylinder 12 to rest in the palm 18 of the user's hand 20. The user 24 may be a visually impaired person, a hearing impaired person or any other user with a physical disability that limits their ability to interact with the physical world. The communication pad 22 has a plurality of Braille dots 26 that is each integrated into the communication pad 22. In this way each of the Braille dots 26 can touch the user's palm 18 when the cylinder 12 is gripped.

The cylinder 12 has an outer wall 28 extending between the lower end 14 and the upper end 16, and the upper end 16 has a first well 30 extending toward the lower end 14. The first well 30 is centrally positioned on the upper end 16 and the first well 30 has a lower bounding surface 32. The upper end 16 has a second well 34 extending toward the lower end 14, the second well 34 is centrally positioned in the first well 30 and the second well 34 has a bottom bounding surface 36. The cylinder 12 has an opening 38 extending through the outer wall 28, and the opening 38 has a bounding edge 40. The bounding edge 40 has a lower side 42, an upper side 44, a first lateral side 46 and a second lateral side 48. Each of the first lateral side 46 and the second lateral side 48 extends a substantial distance between the lower end 14 and the upper end 16 of the cylinder 12. Each of the first lateral side 46 and the second lateral side 48 angles outwardly between the lower side 42 and the upper end 16 such that the opening 38 has a trapezoidal shape.

Figure 2:
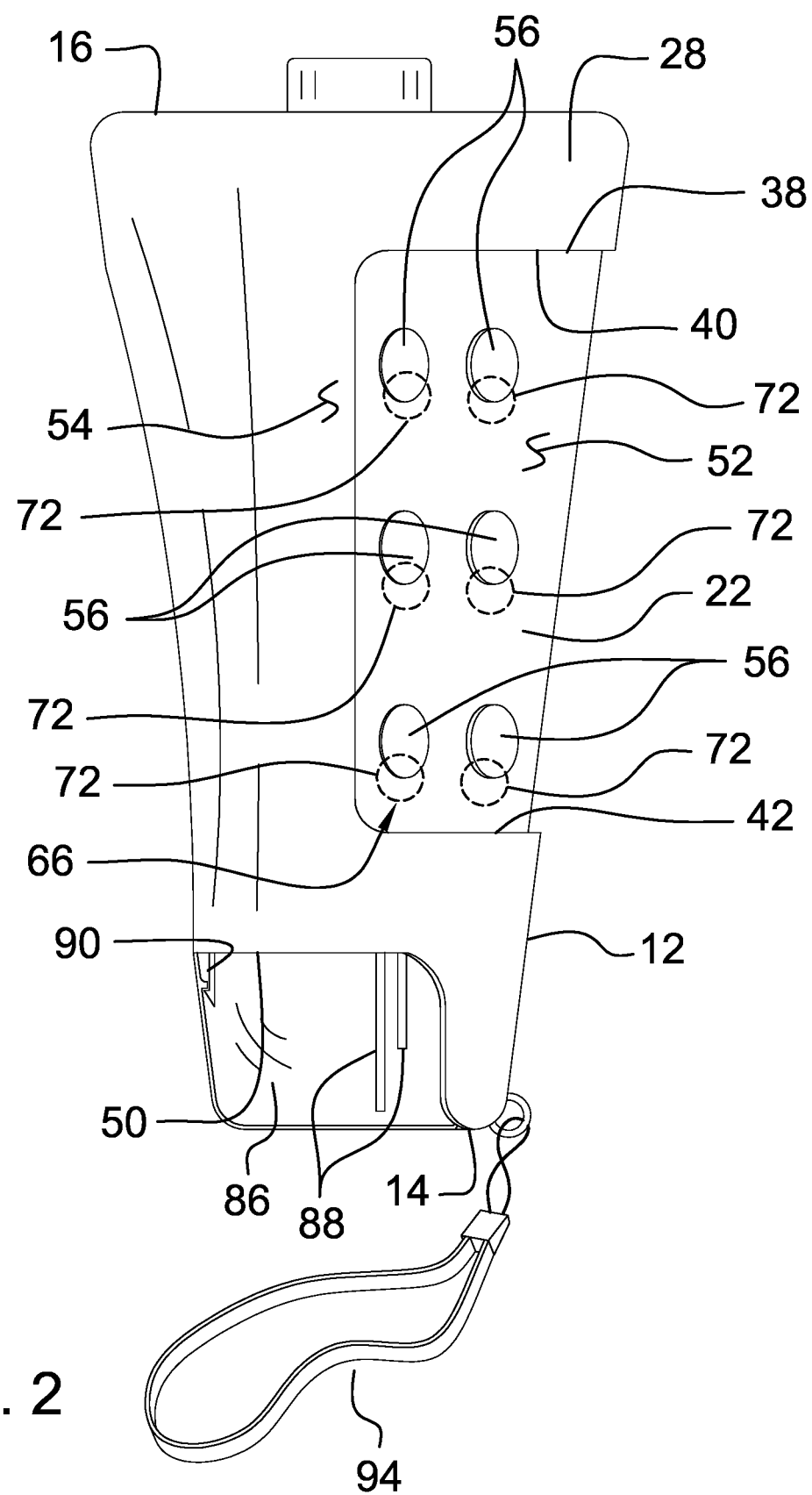
FIG. 2 is a right side phantom view of an embodiment of the disclosure.
Figure 3:
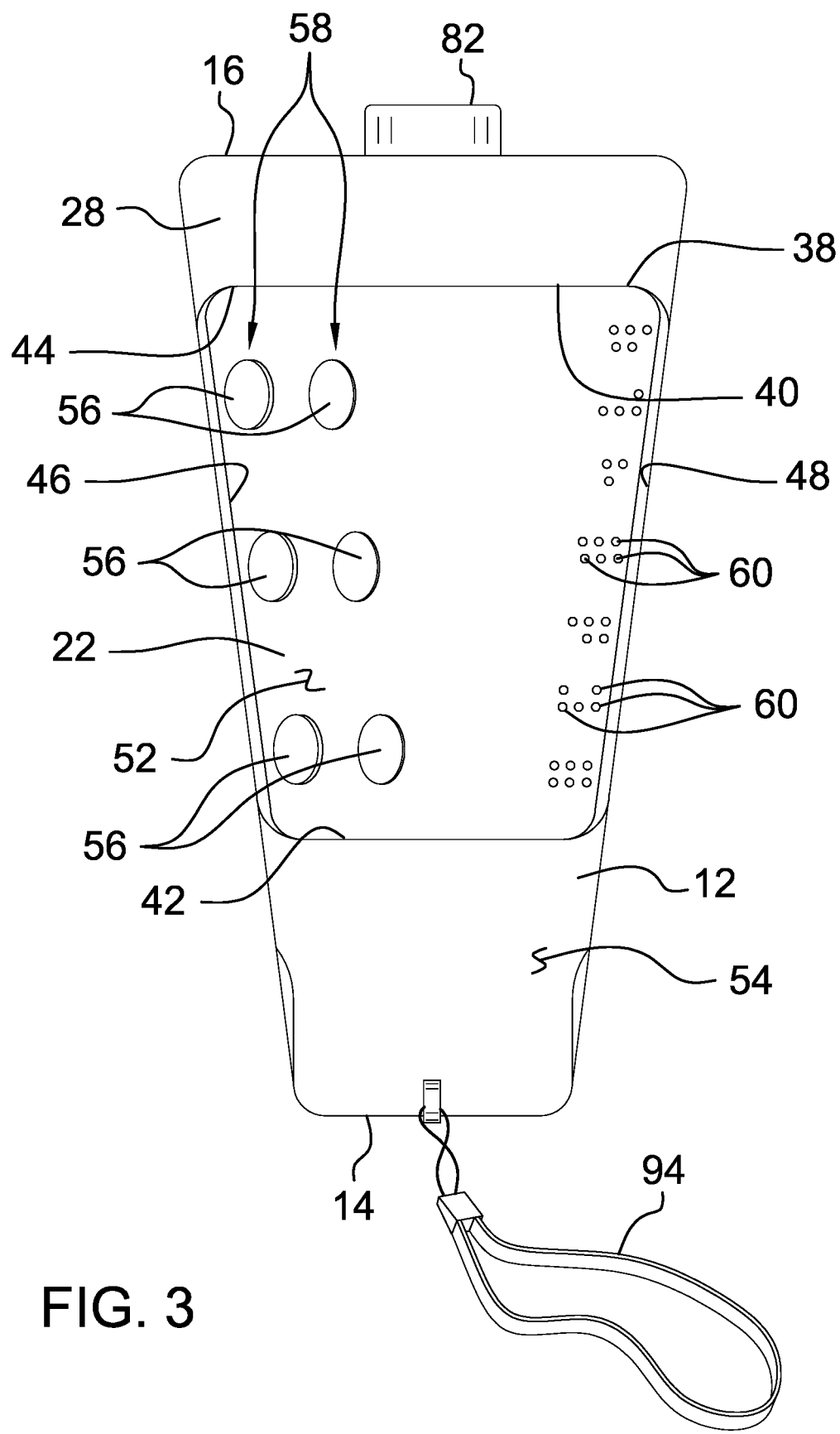
FIG. 3 is a front view of an embodiment of the disclosure.
Figure 4:
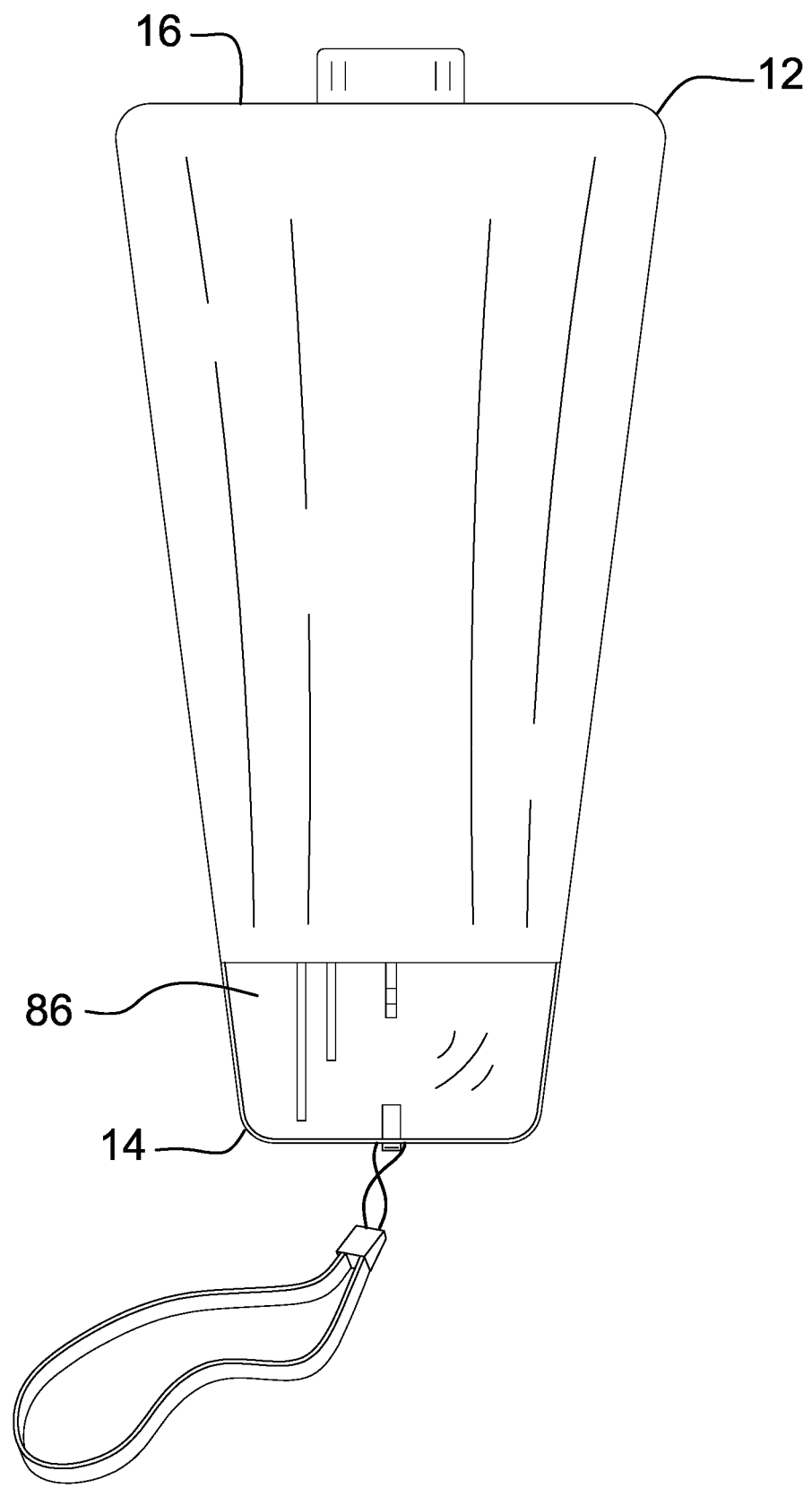
FIG. 4 is a back view of an embodiment of the disclosure.
Figure 5:
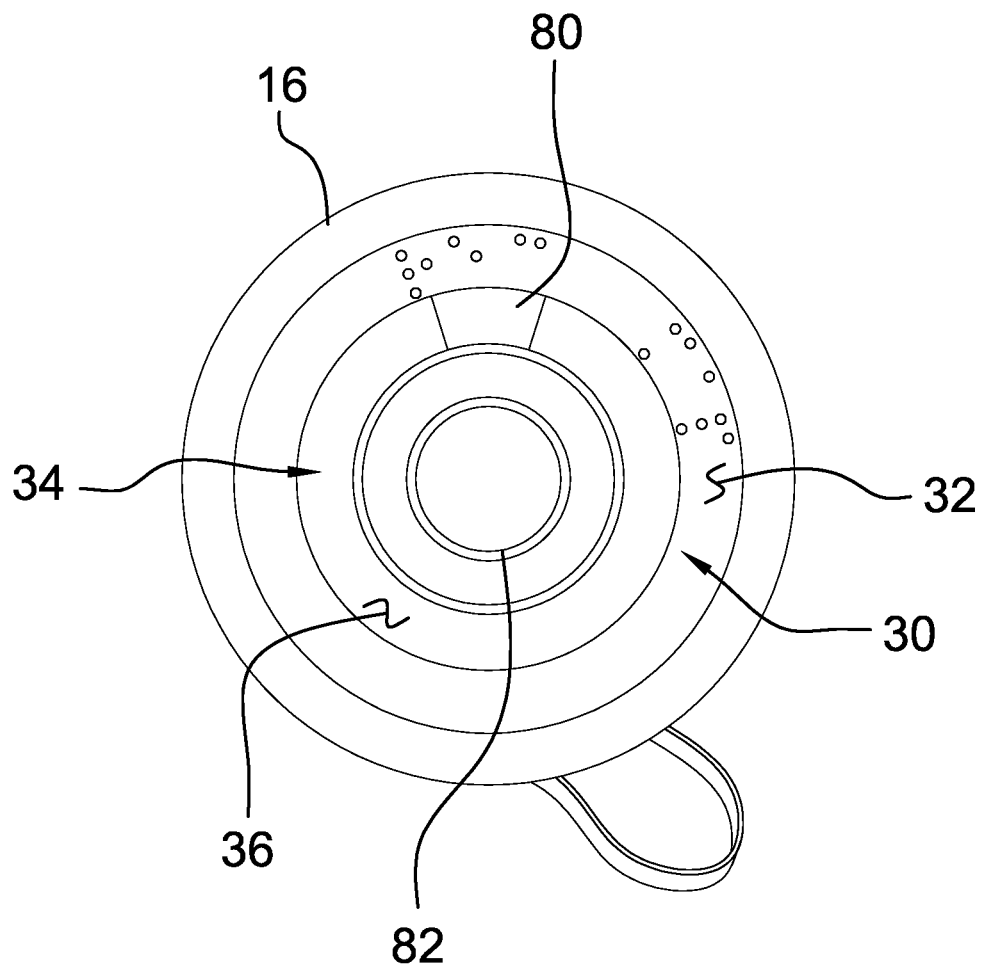
FIG. 5 is a top view of an embodiment of the disclosure.
Figure 6:
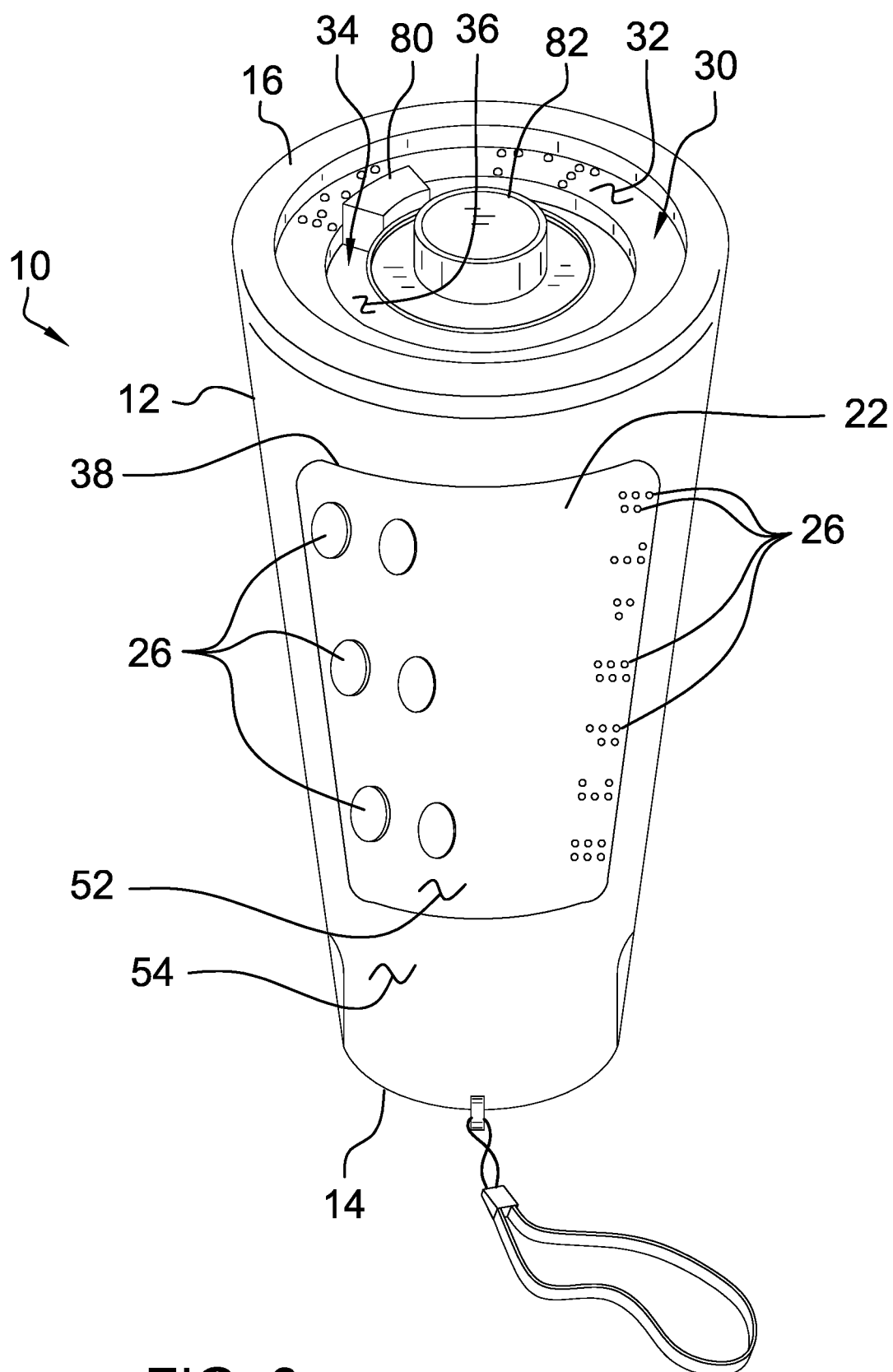
FIG. 6 is a top perspective view of an embodiment of the disclosure.
Figure 7:
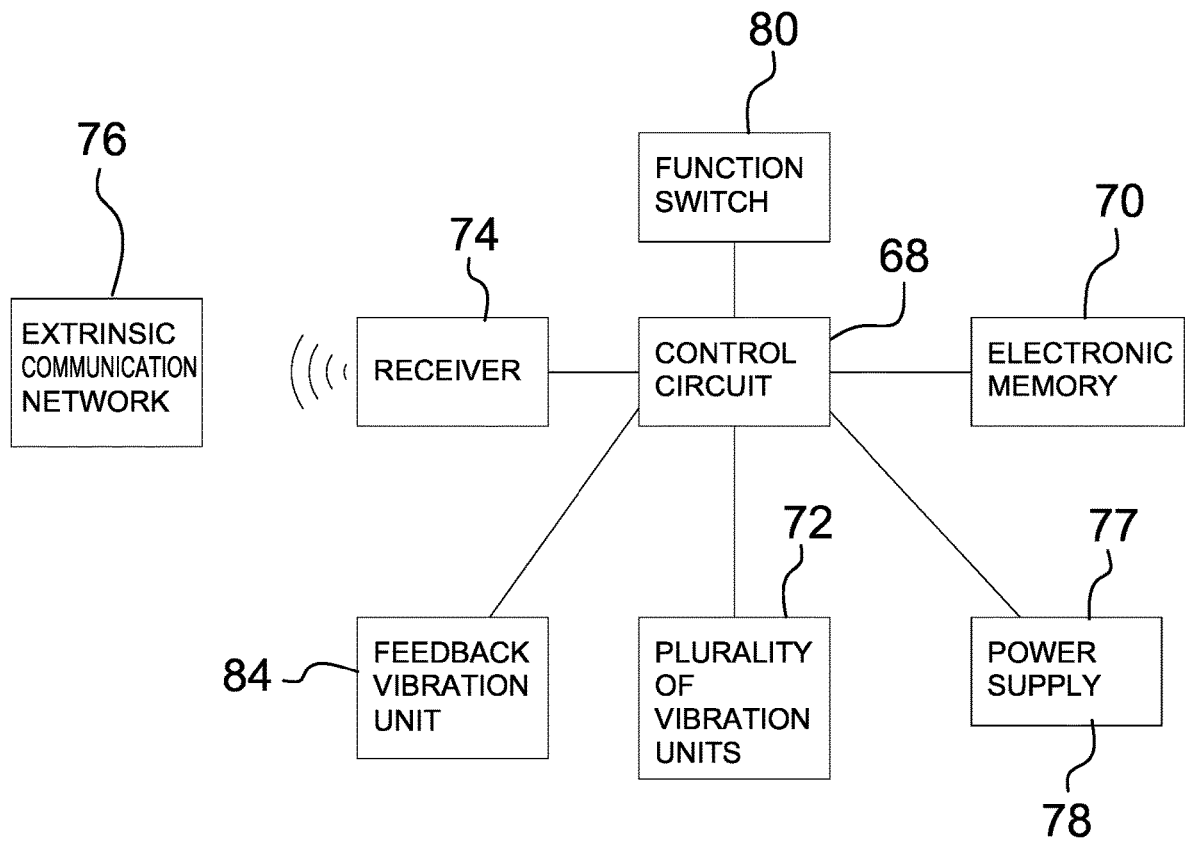
FIG. 7 is a schematic view of an embodiment of the disclosure.
Figure 8:
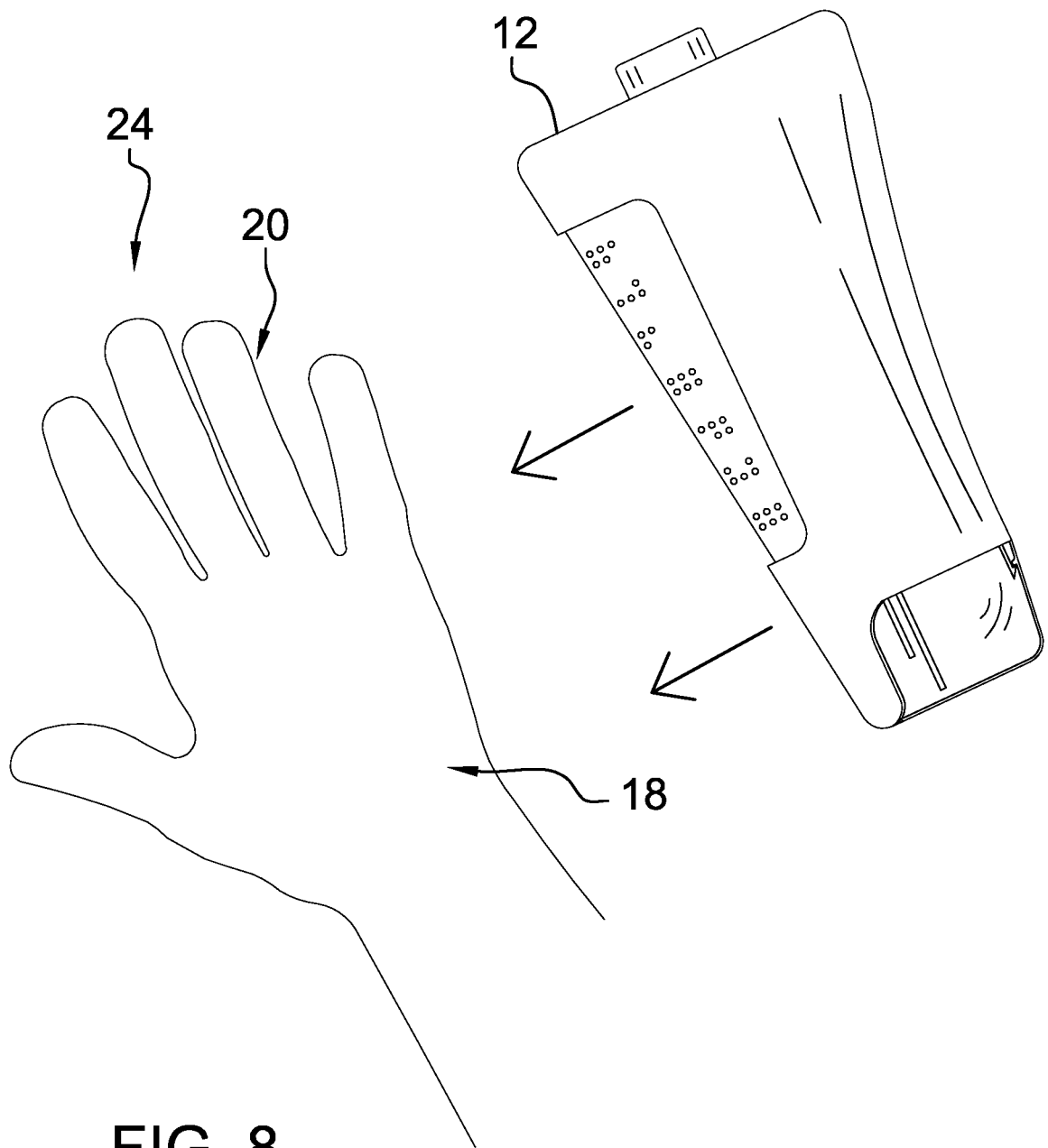
FIG. 8 is a perspective in-use view of an embodiment of the disclosure.

As is most clearly shown in FIG. 2, the outer wall 28 of the cylinder 12 curves inwardly between the upper end 16 and the lower end 14 of the cylinder 12 on an opposite side of the outer wall 28 with respect to the opening 38. In this way the outer wall 28 enhances gripping the cylinder 12. The cylinder 12 has a hole 50 extending through the outer wall 28 and the lower end 14, and the hole 50 extends around a substantial circumference of the outer wall 28. The hole 50 is positioned on an opposing side of the outer wall 28 with respect to the opening 38 in the outer wall 28. The communication pad 22 is positioned in the opening 38, the communication pad 22 has an outwardly facing surface 52 and the outwardly facing surface 52 is recessed with respect to an outer surface 54 of the outer wall 28. Furthermore, the communication pad 22 is comprised of a flexible material, including but not being limited to, rubber or silicone.

The plurality of Braille dots 26 includes a plurality of first Braille dots 56 each extending outwardly from the outwardly facing surface 52. In this way each of the first Braille dots 56 touches the user's palm 18 when the cylinder 12 is gripped. The first Braille dots 56 are arranged in a pair of rows 58 each being distributed along an axis extending between the upper end 16 and the lower end 14 of the cylinder 12. Additionally, the plurality of first Braille dots 56 is positioned adjacent to the first lateral side 46 of the bounding edge 40 of the opening 38 in the outer wall 28 of the cylinder 12. Each of the first Braille dots 56 has a diameter of at least 0.30 inches such that each of the first Braille dots 56 can be sensed by the user's palm 18.

The plurality of Braille dots 26 includes a plurality of second Braille dots 60 each extending outwardly from the outwardly facing surface 52 of the communication pad 22. The plurality of second Braille dots 60 are arranged in a plurality of sets of second Braille dots 62. Furthermore, each of the sets of second Braille dots 62 is arranged to define a respective letter of the Braille alphabet. The sets of second Braille dots 62 are spaced apart from each other and are distributed along the axis extending between the upper end 16 and the lower end 14 of the cylinder 12.

The set of second Braille dots 62 are distributed along the second lateral side 48 of the bounding edge 40 of the opening 38 in the outer wall 28 of the cylinder 12. Each of the second Braille dots 60 has a diameter that is less than 0.30 inches. In this way each of the second Braille dots 60 can be touched by the user 24's fingertips. The cylinder 12 has a plurality of third Braille dots 64 each being integrated into the lower bounding surface 32 of the first well 30. Moreover, the third Braille dots 64 communicate predetermined instructions to the user 24 which pertains to various functions that the communication pad 22 can perform.

A communication unit 66 is integrated into the cylinder 12 and the communication unit 66 is in mechanical communication with respective Braille dots 26 in the communication pad 22. The communication unit 66 vibrates the respective Braille dots 26 according to a pre-determined sequence. In this way the respective Braille dots 26 can communicate instructions to the user 24. The communication unit 66 comprises a control circuit 68 that is integrated into the cylinder 12 and the control circuit 68 includes an electronic memory 70. The electronic memory 70 stores a database comprising the Braille alphabet in a language corresponding to the native language of the user 24.

The communication unit 66 includes a plurality of vibration units 72 that is each integrated into the communication pad 22. Each of the vibration units 72 is aligned with a respective one of the plurality of first Braille dots 56 and each of the vibration units 72 is electrically coupled to the control circuit 68. Respective ones of the plurality of vibration units 72 are actuated to vibrate the respective first Braille dots 56 in a predetermined sequence which corresponds to letters of the alphabet of the user 24's native language. In this way the plurality of vibration units 72 facilitate the user 24 to understand a message that is being communicated to the user 24. Furthermore, all of the vibration units 72 are actuated to vibrate all of the plurality of first Braille dots 56 when the predetermined sequence which corresponds to letters of the alphabet is completed. In this way the plurality of vibration units 72 communicate to the user 24 that the message is complete. Each of the vibration units 72 may comprise an electronic vibrator which includes an electric motor and an eccentric cam that engages the respective first Braille dot.

The communication unit 66 includes a receiver 74 that is integrated into the cylinder 12 and the receiver 74 is electrically coupled to the control circuit 68. The receiver 74 is in wireless communication with an extrinsic communication network 76 thereby facilitating the control circuit 68 to receive data from the extrinsic communication network 76 comprising navigation data or a text message. The extrinsic communication network 76 may be a cellular phone network, the internet or any other wireless communication network. Furthermore, the receiver 74 may receive navigation data from a global positioning system that is commonly employed by smart phone navigation apps.

Each of the vibration units 72 is actuated in a predetermined sequence which corresponds to the navigation data or the text message to communicate the navigation data or the text message to the user 24. The text message may be a text message that would commonly be communicated with a smart phone or other type of personal electronic device. The receiver 74 may comprise a radio frequency receiver or the like and the receiver 74 may employ a wireless personal area network signal or a global system for mobile communication signal. The communication unit 66 includes a power supply 77 that is integrated into the cylinder 12. The power supply 77 is electrically coupled to the control circuit 68 and the power supply 77 comprises at least one battery 78.

A function switch 80 is movably integrated into the upper end 16 of the cylinder 12 and the function switch 80 can be manipulated by the user 24. The function switch 80 is in communication with the communication unit 66 for actuating the communication unit 66 into one of a plurality of predetermined operational sequences. The function switch 80 extends upwardly from the bottom bounding surface 36 of the second well 34 in the upper end 16 of the cylinder 12. Furthermore, the function switch 80 is positioned adjacent to a threshold between the first well 30 and the second well 34, and the function switch 80 is electrically coupled to the control circuit 68. The plurality of predetermined operational sequences might include text messaging, global positioning system navigation, language learning lessons and various other sequences that might be useful for the user 24.

A feedback stick 82 extends away from the upper end 16 of the cylinder 12 such that the feedback stick 82 can be touched by the user 24. The feedback stick 82 is in mechanical communication with the communication unit 66 and the communication unit 66 vibrates the feedback stick 82 in a predetermined sequence of vibrations. In this way the feedback stick 82 can communicate which of the operational sequences the communication unit 66 has been actuated to perform. The feedback stick 82 extends upwardly from the bottom bounding surface 36 of the second well 34 in the upper end 16 of the cylinder 12 and the feedback stick 82 is centrally positioned in the second well 34. The communication unit 66 includes a feedback vibration unit 84 that is integrated into the feedback stick 82. The feedback vibration unit 84 is electrically coupled to the control circuit 68 and the feedback vibration unit 84 vibrates the feedback stick 82 in accordance with the predetermined sequence of vibrations corresponding to the operational sequences. Furthermore, the feedback vibration unit 84 may comprise an electric motor and an eccentric cam or the like.

A lens 86 is hingedly coupled to the cylinder 12 and the lens 86 is oriented to completely cover the hole 50 in the lower end 14 and the outer wall 28 of the cylinder 12. The lens 86 has a curved profile which conforms to curvature of the outer wall 28 and the lower end 14 of the cylinder 12. Additionally, the lens 86 is comprised of a translucent material to pass light through the lens 86. A plurality of members 88 may each be positioned within said hole 50 such that each of the members 88 is oriented to extend along the axis extending between the upper end 16 and the lower end 14 of the cylinder 12. The members 88 are strategically positioned such that a sighted person can employ the members 88 for orienting the cylinder 12 on a level plane with respect to the horizon.

A closure 90 is coupled to the cylinder 12 and the closure 90 extends downwardly into the hole 50 in the lower end 14 and the outer wall 28 of the cylinder 12. The closure 90 engages an engagement 92 on the lens 86 to releasably retain the lens 86 in a closed position. A wrist strap 94 is coupled to the outer wall 28 of the cylinder 12 and the wrist strap 94 forms a closed loop which can be worn around a wrist 96 of the user 24 to inhibit the user 24 from inadvertently dropping the cylinder 12.

In use, the cylinder 12 is gripped such that each of the first Braille dots 56 rests in the palm 18 of the user's hand 20. The function switch 80 is manipulated to actuate the communication unit 66 to perform a respective one of the operational sequences, depending upon the user's 24 preference. Additionally, the feedback stick 82 vibrates in a predetermined sequence to communicate to the user 24 which of the operational sequences has been selected. The vibration units 72 associated with each of the first Braille dots 56 vibrates in a variety of predetermined sequences to facilitate a message to be communicated to the user 24. Furthermore, all of the vibration units 72 are turned on when the message is complete to communicate the end of the message to the user 24. In this way the first Braille dots 56 translates any message, including text messages or navigation data, to the user 24 for the user 24 to understand. Furthermore, the vibration units 72 may be actuated in a variety of sequences to teach the user 24 to understand Braille in accordance with a variety of learning sequences that are stored in the electronic memory 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A handheld Braille assembly for assisting a visually or hearing impaired user with navigation and communication, said assembly comprising:

a cylinder having a lower end and an upper end, said cylinder tapering between said upper end and said lower end such that said cylinder has a frusto-conical shape wherein said cylinder is configured to fit comfortably in a palm of a user's hand, said cylinder having a communication pad being integrated into said cylinder, said communication pad being strategically located on said cylinder wherein said communication pad is configured to rest in the palm of the user's hand, said communication pad having a plurality of Braille dots each being integrated into said communication pad wherein each of said Braille dots is configured to touch the user's palm when said cylinder is gripped;

a communication unit being integrated into said cylinder, said communication unit being in mechanical communication with respective ones of said Braille dots in said communication pad, said communication unit vibrating said respective Braille dots according to a pre-determined sequence wherein said respective Braille dots is configured to communicate instructions to the user;

a function switch being movably integrated into said upper end of said cylinder wherein said function switch is configured to be manipulated by the user, said function switch being in communication with said communication unit for actuating said communication unit into one of a plurality of predetermined operational sequences; and a feedback stick extending away from said upper end of said cylinder wherein said feedback stick is configured to be touched by the user, said feedback stick being in mechanical communication with said communication unit, said communication unit vibrating said feedback stick in a predetermined sequence of vibrations wherein said feedback stick is configured to communicate which of said operational sequences said communication unit has been actuated to perform.

2. The assembly according to claim 1, wherein:
said cylinder has an outer wall extending between said lower end and said upper end;
said upper end has a first well extending toward said lower end, said first well being centrally positioned on said upper end, said first well having a lower bounding surface;
said upper end has a second well extending toward said lower end, said second well being centrally positioned in said first well, said second well having a bottom bounding surface;
said cylinder has an opening extending through said outer wall, said opening having a bounding edge, said bounding edge having a lower side, an upper side, a first lateral side and a second lateral side, each of said first lateral side and said second lateral side extending a substantial distance between said lower end and said upper end of said cylinder, each of said first lateral side and said second lateral side angling outwardly between said lower side and said upper end such that said opening has a trapezoidal shape;
said outer wall of said cylinder curves inwardly between said upper end and said lower end of said cylinder on an opposite side of said outer wall with respect to said opening wherein said outer wall is configured to enhance gripping said cylinder; and
said cylinder has a hole extending through said outer wall and said lower end, said hole extending around a substantial circumference of said outer wall, said hole being positioned on an opposing side of said outer wall with respect to said opening in said outer wall.

3. The assembly according to claim 2, wherein said communication pad is positioned in said opening, said communication pad having an outwardly facing surface, said outwardly facing surface being recessed with respect to an outer surface of said outer wall, said communication pad being comprised of a flexible material.

4. The assembly according to claim 3, wherein:
said plurality of Braille dots includes a plurality of first Braille dots each extending outwardly from said outwardly facing surface wherein each of said first Braille dots is configured to touch the user's palm when said cylinder is gripped;
said first Braille dots is arranged in a pair of rows each being distributed along an axis extending between said upper end and said lower end of said cylinder; and
said plurality of first Braille dots is positioned adjacent to said first lateral side of said bounding edge of said opening in said outer wall of said cylinder.

5. The assembly according to claim 4, wherein each of said first Braille dots has a diameter of at least 0.30 inches wherein each of said first Braille dots is configured to be sensed by the user's palm.

6. The assembly according to claim 4, wherein:
said plurality of Braille dots includes a plurality of second Braille dots each extending outwardly from said outwardly facing surface of said communication pad;
said plurality of second Braille dots is arranged in a plurality of sets of second Braille dots, each of said sets of second Braille dots being arranged to define a respective letter of the Braille alphabet;
said sets of second Braille dots being spaced apart from each other and being distributed along said axis extending between said upper end and said lower end of said cylinder; and
said sets of second Braille dots is distributed along said second lateral side of said bounding edge of said opening in said outer wall of said cylinder.

7. The assembly according to claim 6, wherein each of said second Braille dots has a diameter being less than 0.30 inches wherein each of said second Braille dots is configured to be touched by the user's fingertips.

8. The assembly according to claim 6, wherein said cylinder has a plurality of third Braille dots each being integrated into said lower bounding surface of said first well wherein said third Braille dots are configured to communicate predetermined instructions to the user.

9. The assembly according to claim 4, wherein said communication unit comprises:
a control circuit being integrated into said cylinder, said control circuit including an electronic memory, said electronic memory storing a database comprising the Braille alphabet in a language corresponding to the native language of the user; and
a plurality of vibration units, each of said vibration units being integrated into said communication pad, each of said vibration units being aligned with a respective one of said plurality of first Braille dots, each of said vibration units being electrically coupled to said control circuit, respective ones of said plurality of vibration units being actuated to vibrate said respective first Braille dots in a predetermined sequence which corresponds to letters of the alphabet of the user's native language wherein said plurality of vibration units is configured to facilitate the user to understand a message being communicated to the user, all of said vibration units being actuated to vibrate all of said plurality of first Braille dots when said predetermined sequence which corresponds to letters of the alphabet is completed wherein said plurality of vibration units is configured to communicate to the user that the message is complete.

10. The assembly according to claim 9, wherein said communication unit comprises a receiver being integrated into said cylinder, said receiver being electrically coupled to said control circuit, said receiver being in wireless communication with an extrinsic communication network thereby facilitating said control circuit to receive data from the extrinsic communication network comprising navigation data or a text message, each of said vibration units being actuated in a predetermined sequence which corresponds to the navigation data or the text message wherein said vibration units are configured to communicate the navigation data or the text message to the user.

11. The assembly according to claim 9, wherein said function switch extends upwardly from said bottom bounding surface of said second well in said upper end of said cylinder, said function switch being positioned adjacent to a threshold between said first well and said second well, said function switch being electrically coupled to said control circuit.

12. The assembly according to claim 9, wherein said feedback stick extends upwardly from said bottom bounding surface of said second well in said upper end of said cylinder, said feedback stick being centrally positioned in said second well, said communication unit including a feedback vibration unit being integrated into said feedback stick, said feedback vibration unit being electrically coupled to said control circuit, said feedback vibration unit vibrating said feedback stick in accordance with said predetermined sequence of vibrations corresponding to said operational sequences.

13. The assembly according to claim 2, further comprising a lens being hingedly coupled to said cylinder, said lens being oriented to completely cover said hole in said lower end and said outer wall of said cylinder, said lens having a curved profile which conforms to curvature of said outer wall and said lower end of said cylinder, said lens being comprised of a translucent material wherein said lens is configured to pass light through said lens.

14. The assembly according to claim 13, further comprising a closure being coupled to said cylinder, said closure extending downwardly into said hole in said lower end and said outer wall of said cylinder, said closure engaging an engagement on said lens to releasably retain said lens in a closed position.

15. The assembly according to claim 2, further comprising a wrist strap being coupled to said outer wall of said cylinder, said wrist strap forming a closed loop wherein said wrist strap is configured to be worn around a wrist of the user to inhibit the user from inadvertently dropping said cylinder.

16. A handheld Braille assembly for assisting a visually or hearing impaired user with navigation and communication, said assembly comprising:
a cylinder having a lower end and an upper end, said cylinder tapering between said upper end and said lower end such that said cylinder has a frusto-conical shape wherein said cylinder is configured to fit comfortably in a palm of a user's hand, said cylinder having a communication pad being integrated into said cylinder, said communication pad being strategically located on said cylinder wherein said communication pad is configured to rest in the palm of the user's hand, said communication pad having a plurality of Braille dots each being integrated into said communication pad wherein each of said Braille dots is configured to touch the user's palm when said cylinder is gripped, said cylinder having an outer wall extending between said lower end and said upper end, said upper end having a first well extending toward said lower end, said first well being centrally positioned on said upper end, said first well having a lower bounding surface, said upper end having a second well extending toward said lower end, said second well being centrally positioned in said first well, said second well having a bottom bounding surface, said cylinder having an opening extending through said outer wall, said opening having a bounding edge, said bounding edge having a lower side, an upper side, a first lateral side and a second lateral side, each of said first lateral side and said second lateral side extending a substantial distance between said lower end and said upper end of said cylinder, each of said first lateral side and said second lateral side angling outwardly between said lower side and said upper end such that said opening has a trapezoidal shape, said outer wall of said cylinder curving inwardly between said upper end and said lower end of said cylinder on an opposite side of said outer wall with respect to said opening wherein said outer wall is configured to enhance gripping said cylinder, said cylinder having a hole extending through said outer wall and said lower end, said hole extending around a substantial circumference of said outer wall, said hole being positioned on an opposing side of said outer wall with respect to said opening in said outer wall, said communication pad being positioned in said opening, said communication pad having an outwardly facing surface, said outwardly facing surface being recessed with respect to an outer surface of said outer wall, said communication pad being comprised of a flexible material, said plurality of Braille dots including a plurality of first Braille dots each extending outwardly from said outwardly facing surface wherein each of said first Braille dots is configured to touch the user's palm when said cylinder is gripped, said first Braille dots being arranged in a pair of rows each being distributed along an axis extending between said upper end and said lower end of said cylinder, said plurality of first Braille dots being positioned adjacent to said first lateral side of said bounding edge of said opening in said outer wall of said cylinder, each of said first Braille dots having a diameter of at least 0.30 inches wherein each of said first Braille dots is configured to be sensed by the user's palm, said plurality of Braille dots including a plurality of second Braille dots each extending outwardly from said outwardly facing surface of said communication pad, said plurality of second Braille dots being arranged in a plurality of sets of second Braille dots, each of said sets of second Braille dots being arranged to define a respective letter of the Braille alphabet, said sets of second Braille dots being spaced apart from each other and being distributed along said axis extending between said upper end and said lower end of said cylinder, said sets of second Braille dots being distributed along said second lateral side of said bounding edge of said opening in said outer wall of said cylinder, each of said second Braille dots having a diameter being less than 0.30 inches wherein each of said second Braille dots is configured to be touched by the user's fingertips, said cylinder having a plurality of third Braille dots each being integrated into said lower bounding surface of said first well wherein said third Braille dots are configured to communicate predetermined instructions to the user;
a communication unit being integrated into said cylinder, said communication unit being in mechanical communication with respective ones of said Braille dots in said communication pad, said communication unit vibrating said respective Braille dots according to a pre-determined sequence wherein said respective Braille dots is configured to communicate instructions to the user, said communication unit comprising:
a control circuit being integrated into said cylinder, said control circuit including an electronic memory, said electronic memory storing a database comprising the Braille alphabet in a language corresponding to the native language of the user;
a plurality of vibration units, each of said vibration units being integrated into said communication pad, each of said vibration units being aligned with a respective one of said plurality of first Braille dots, each of said vibration units being electrically coupled to said control circuit, respective ones of said plurality of vibration units being actuated to vibrate said respective first Braille dots in a predetermined sequence which corresponds to letters of the alphabet of the user's native language wherein said plurality of vibration units is configured to facilitate the user to understand a message being communicated to the user, all of said vibration units being actuated to vibrate all of said plurality of first Braille dots when said predetermined sequence which corresponds to letters of the alphabet is completed wherein said plurality of vibration units is configured to communicate to the user that the message is complete; and a receiver being integrated into said cylinder, said receiver being electrically coupled to said control circuit, said receiver being in wireless communication with an extrinsic communication network thereby facilitating said control circuit to receive data from the extrinsic communication network comprising navigation data or a text message, each of said vibration units being actuated in a predetermined sequence which corresponds to the navigation data or the text message wherein said vibration units are configured to communicate the navigation data or the text message to the user; and a power supply being integrated into said cylinder, said power supply being electrically coupled to said control circuit, said power supply comprising at least one battery;

a function switch being movably integrated into said upper end of said cylinder wherein said function switch is configured to be manipulated by the user, said function switch being in communication with said communication unit for actuating said communication unit into one of a plurality of predetermined operational sequences, said function switch extending upwardly from said bottom bounding surface of said second well in said upper end of said cylinder, said function switch being positioned adjacent to a threshold between said first well and said second well, said function switch being electrically coupled to said control circuit;

a feedback stick extending away from said upper end of said cylinder wherein said feedback stick is configured to be touched by the user, said feedback stick being in mechanical communication with said communication unit, said communication unit vibrating said feedback stick in a predetermined sequence of vibrations wherein said feedback stick is configured to communicate which of said operational sequences said communication unit has been actuated to perform, said feedback stick extending upwardly from said bottom bounding surface of said second well in said upper end of said cylinder, said feedback stick being centrally positioned in said second well, said communication unit including a feedback vibration unit being integrated into said feedback stick, said feedback vibration unit being electrically coupled to said control circuit, said feedback vibration unit vibrating said feedback stick in accordance with said predetermined sequence of vibrations corresponding to said operational sequences;

a lens being hingedly coupled to said cylinder, said lens being oriented to completely cover said hole in said lower end and said outer wall of said cylinder, said lens having a curved profile which conforms to curvature of said outer wall and said lower end of said cylinder, said lens being comprised of a translucent material wherein said lens is configured to pass light through said lens;

a closure being coupled to said cylinder, said closure extending downwardly into said hole in said lower end and said outer wall of said cylinder, said closure engaging an engagement on said lens to releasably retain said lens in a closed position; and a wrist strap being coupled to said outer wall of said cylinder, said wrist strap forming a closed loop wherein said wrist strap is configured to be worn around a wrist of the user to inhibit the user from inadvertently dropping said cylinder.

* * * * *